United States Patent Office 2,976,306
Patented Mar. 21, 1961

2,976,306

IMPROVEMENT IN THE PROCESS OF TRANSALKYLATING ALUMINUM

Robert A. Walde, Pittsburgh, Pa., assignor to Goodrich-Gulf Chemicals, Inc., Cleveland, Ohio, a corporation of Delaware No Drawing. Filed June 17, 1958, Ser. No. 742,488

8 Claims. (Cl. 260—448)

This invention relates to organo-metallo compounds and more particularly to an improved process for transalkylating organo-metallo compounds.

Organo-metallo compounds can be reacted with an olefin to form a resultant compound comprised of the metal portion of the organo-metallo compound and said olefin. The resultant compound can be employed as catalyst, hydrolyzed to obtain hydrocarbons, oxidized and subsequently hydrolyzed to obtain alcohols, chlorinated to obtain primary alkyl chlorides, etc. Unfortunately the reaction requires an extended period of time and consequently there is a tendency to form objectionable amounts of dimers of said olefin. In addition, certain olefins, such as internal or cyclic olefins, will essentially not react with the organo-metallo compound using conventional operating conditions.

I have found that the above difficulties can be avoided and olefins of all types, including the olefins referred to above, can be reacted with the organo-metallo compound in a relatively short reaction period by a process which comprises heating the organo-metallo compound in a closed system for a sufficient length of time to permit an equilibrium to be reached between the organo-metallo compound and its decomposition compounds and thereafter introducing said olefin in said closed system to obtain the desired transalkylated product.

The organo-metallo compounds which can be employed in the reaction with the olefin can be represented by the following structural formula:

$$R_xMe$$

wherein R is a hydrogen, a halogen such as chlorine, or a hydrocarbon radical having from 2 to 28 carbon atoms, preferably 2 to 6 carbon atoms, such as alkyl, aryl, alkaryl, aralkyl, cycloalkyl, alkenyl, aralkenyl, or cycoalkenyl, straight or branch chained, or a substituted hydrocarbon radical. Me is a metal such as aluminum, antimony, bismuth, cadmium, copper, gallium, germanium, indium, lead, mercury, thallium, tin and zinc, and $x$ is the valence of Me. Examples of such organo-metallo compounds are triethyl aluminum, triisobutyl aluminum, tripentyl aluminum, triethyl boron, triisobutyl boron, etc. Preferred among the compounds for use in the process of this invention are aluminum trialkyls.

Any olefin, including internal and cyclic olefins, can be employed in the reaction with the organo-metallo compound. Alpha, gamma olefins, for example, can be used and can be made to react in the gamma as well as the alpha position. The olefins employed can have 2 to 28 carbon atoms, preferably 8 to 18 carbon atoms, in the molecule. Examples of olefins which can be used in the present process include ethylene, octene-1, octene-2, cyclohexene, butadiene, 1-pentadecene, 1-cyclopentyl-2-butene, etc.

In order to obtain the desired reaction between the organo-metallo compound and the olefin and to complete the reaction in a relatively short period of time, it has been found absolutely necessary to place the organo-metallo compound in a state of increased activation prior to the reaction with the olefin. This is effected by placing the organo-metallo compound in a closed system, preferably after the system has been purged with an inert gas such as nitrogen, and heating the same at an elevated temperature, for example, about 90° to about 200° C. preferably about 130° to about 180° C., until an autogeneous pressure is reached therein. Good stirring should be maintained to prevent stagnation of the alkyl on the surface of the reactor. This autogeneous pressure indicates that a state of equilibrium has been reached between the organo-metallo compound and its decomposition products. The attainment of this equilibrium is found to exist when the pressure in the system becomes substantially steady and constant. While the time required to attain such equilibrium will vary and will depend upon many variables such as the temperature employed and organo-metallo compound used, in general, a period of about 0.25 hour to about 2 hours, and preferably about 0.5 hour to about one hour is sufficient. The pressure, when such equilibrium has been reached, will be about 20 to about 80, preferably about 30 to about 40, pounds per square inch gauge.

At this point the organo-metallo compound is in a state of "increased activation." Taking triisobutyl aluminum as an example, it is believed that upon the initial application of heat cleavage occurs at the bond between the aluminum and one of the isobutyl groups to produce diisobutyl aluminum hydride and isobutylene. This reaction is reversible and it is believed that such reversibility, indicating a constant state of change in said aluminum bond, accounts for the activated state of the organo-metallo compounds. When the autogeneous pressure defined above is reached and the olefin is introduced into the system, the diisobutyl aluminum hydride or other hydrides formed in the system are being competed for by both the isobutylene formed and the feed olefin. These other hydrides might include monoisobutyl-aluminum dihydride or monooctyl-monoisobutyl aluminum hydride. The desired transalkylation reaction can therefore be pushed to a maximum by removal of the isobutylene as quickly as possible from the system, so that the feed olefin can react with the diisobutyl aluminum hydride, and by the addition of the feed olefin as fast as possible.

When the feed olefin is introduced into the system, particularly a dimerizable olefin such as an alpha olefin, for example, octene-1, theoretically it should be introduced therein at a rate substantially equal to the rate at which isobutylene is evolved in order to have no excess olefin available for reactions such as the dimerization reaction. While an increased olefin feed rate will increase the rate of the transalkylation reaction, it will, at the same time, increase the rate, for example, of a dimerization reaction. It has been found, however, that if the rate of the olefin feed addition is maintained the same as the isobutylene removal, the transalkylation reaction will have a tendency to be sluggish in going to completion. Normally a one to about 2 mol percent of feed olefin over the olefin evolved is sufficient to speed the rate of the transalkylation reaction. Surprisingly, this small excess has not served appreciably to increase the dimerization reaction. The rate at which the evolved olefin is removed from the closed system is of course dependent upon the transalkylation rate at the temperature employed. In general, the transalkylation rate under the reaction conditions defined herein is about 0.30 to about 0.060 cubic feet of evolved olefin per minute per atom of metal.

It is believed that the transalkylation reaction of the present invention proceeds in step-wise fashion. Referring again to the reaction between triisobutyl aluminum and octene-1 as an example, as soon as the first isobutyl group has been replaced with an octyl group in the manner described above, a second isobutyl group is removed from the aluminum and is replaced with hydrogen, and activation of the bond therebetween occurs as with the first. The reaction with octene-1 then proceeds as previously described. As soon as the second transalkylation is complete, transalkylation of the remaining alkyl group occurs in the manner described above. In general a period of about one to about 3, and preferably about 1.5 to about 2 hours, after the autogeneous pressure has been attained, is sufficient to complete the present reaction.

The invention can be further illustrated by reference to the following examples.

*Example I*

68.5 grams (0.346 mol) of triisobutyl aluminum were charged to a one-liter autoclave and heated with constant stirring to a temperature of 145° C. and held there for one hour until an autogeneous pressure of 30 pounds per square inch gauge was obtained. 116 grams (1.04 mols) of octene-2 were then added slowly (2.40 mols of olefin per mol of aluminum per hour) through an addition tube, while isobutylene was permitted to escape at the rate of 0.527 cubic feet per hour. The reaction took 1.5 hours at a temperature varying from 133° to 146° C. and the pressure decreased steadily. The conversion based on the amount of isobutylene evolved was 86 percent. The resulting aluminum alkyl was placed into a one liter Morton flask attached to a high speed stirrer. Oxygen was passed in while stirring at 5000 r.p.m. at 50 to 60° C. for 60 minutes during which time 8.0 grams of oxygen were absorbed. The resulting alkoxide was hydrolyzed by adding a sufficient quantity of dilute hydrochloric acid to effect the formation of two immiscible phases. Upon distillation, the organic phase yielded 65 grams of a mixture of $C_8$ alcohols (⅓ octanol-1; ⅓ octanol-2; and ⅓ octanol-3) to give a 50 mol percent yield. Only 2 mol percent of $C_{16}$ dimer alkyl was found to be present.

*Example II*

51.8 grams (0.262 mol) of triisobutyl aluminum were charged to a one-liter autoclave and heated with constant stirring to a temperature of 140° C. and held there for one hour until an autogeneous pressure of 30 pounds per square inch gauge was obtained. 77 grams (0.687 mol) of cyclohexene were then added slowly (0.80 mol of olefin per mol of aluminum per hour) through an addition tube, while isobutylene was permitted to escape at the rate of 2.58 cubic feet per hour. The reaction took 1.5 hours at a temperature varying from 130° to 140° C. and the pressure decreased steadily. The conversion based on the amount of isobutylene evolved was 75.7 percent. Seventy-five grams of the resulting cyclohexyl aluminum alkyl were placed into a one-liter flask and diluted with 26.5 grams of n-heptane. The temperature was raised to 50 to 70° C. and pure oxygen was bubbled through while stirring at 2000 r.p.m. In a period of 45 minutes, 8.0 grams of oxygen were utilized. The alkoxide was then hydrolyzed with a sufficient quantity of dilute HCl to cause the formation of two clear immiscible phases. Upon distillation of the organic phase, 20 mol percent yield of cyclohexanol was obtained. Only 2 mol percent of $C_{12}$ dimer alkyl was found to be present.

From the above it can be seen that internal olefins and cyclic olefins can be transalkylated in accordance with the process of this invention. The amount of dimer formation in each instance is extremely low. Internal olefins and cyclic olefins will not react to any appreciable extent at atmospheric pressure and conventional temperatures.

As pointed out above, the present process is effective in reducing substantially the amount of time needed to obtain substantial transalkylation. This is shown below in Examples III and IV.

*Example III*

84.0 grams (0.424 mol) of triisobutyl aluminum were placed into a one-liter round bottom flask along with 1420 grams of octene-1. The mixture was heated to 100° to 130° C., and held there for 9 hours, during which time 67.0 grams of isobutylene were evolved. The resulting alkyl was then charged to a one liter creased flask and oxygen was passed in while stirring at 1000 r.p.m. at 70° C. for two hours. During this time 16.4 grams of oxygen were absorbed. The resulting alkoxide was then hydrolyzed with 200 grams of concentrated HCl and 65 grams of water to give a yield of 49 mol percent octanol-1 and a 30 mol percent yield of $C_{16}$ dimer.

*Example IV*

67.3 grams (0.340 mol) of triisobutyl aluminum were charged to a one-liter autoclave and heated with constant stirring to a temperature of 138° to 150° C. and held there for one hour until an autogeneous pressure of 30 pounds per square inch gauge was obtained. 121 grams (1.08 mols) of octene-1 were then added slowly (1.59 mols of olefin per atom of aluminum per hour) through an addition tube, while isobutylene was permitted to escape at the rate of 0.424 cubic feet per hour. The reaction took 2 hours at a temperature varying from 138° to 150° C. and the pressure decreased steadily. The conversion based on the amount of isobutylene evolved was 95 percent. The resulting aluminum alkyl was placed into a one-liter Morton flask attached to a high speed stirrer. While stirring at 5000 r.p.m., oxygen was passed in at 90° C. for 35 minutes during which time 15.0 grams of oxygen were utilized. The resulting alkoxide was hydrolyzed with a sufficient quantity of dilute HCl to cause the formation of an aqueous and organic phase. Upon distillation of the organic layer, a 79 mol percent yield of octanol-1 was obtained. Only 7 mol percent of $C_{16}$ dimer alkyl was found to be present.

The advantage of operating in accordance with the present invention is further apparent from a comparison of Example III with Example IV. In Example III, which was not operated in accordance with the present process, a total of 9 hours was required to obtain 96 percent conversion, and 30 percent dimer formation was found. When the transalkylation was operated in accordance with the preferred embodiment of the invention, the reaction time was but 2 hours to give a 95 percent conversion. Only 7 percent of dimer was found.

Obviously many modifications and variations of the invention, as hereinabove set forth, can be made without departing from the spirit and scope thereof, and therefore only such limitations should be imposed as are indicated in the appended claims.

I claim:

1. In a process wherein an organo aluminum compound is transalkylated with an olefin having from 2 to 18 carbon atoms, the improvement which comprises heating said organo aluminum compound in a closed system until an autogeneous pressure is reached therein and removing from the system organic material formed as a result of such heating while introducing said olefin in said closed system.

2. In a process wherein an organo aluminum compound is transalkylated with octene-1, the improvement which comprises heating said organo aluminum compound in a closed system until an autogeneous pressure is reached therein and removing from the system organic material formed as a result of such heating while introducing said olefin in said closed system.

3. In a process wherein an organo aluminum compound is transalkylated with octene-2, the improvement which comprises heating said organo aluminum compound in a closed system until an autogeneous pressure is reached therein and removing from the system organic material formed as a result of such heating while introducing said olefin in said closed system.

4. In a process wherein an organo aluminum compound is transalkylated with cyclohexene, the improvement which comprises heating said organo aluminum compound in a closed system until an autogeneous pressure is reached therein and removing from the system organic material formed as a result of such heating while introducing said olefin in said closed system.

5. In a process wherein triisobutyl aluminum is transalkylated with an olefin having from 2 to 18 carbon atoms, the improvement which comprises heating said organo aluminum compound in a closed system until an autogeneous pressure is reached therein and removing from the system organic material formed as a result of such heating while introducing said olefin in said closed system.

6. In a process wherein triisobutyl aluminum is transalkylated with octene-1, the improvement which comprises heating said organo aluminum compound in a closed system until an autogeneous pressure is reached therein and removing from the system organic material formed as a result of such heating while introducing said olefin in said closed system.

7. In a process wherein triisobutyl aluminum is transalkylated with octene-2, the improvement which comprises heating said organo aluminum compound in a closed system until an autogeneous pressure is reached therein and removing from the system organic material formed as a result of such heating while introducing said olefin in said closed system.

8. In a process wherein triisobutyl aluminum is transalkylated with cyclohexene, the improvement which comprises heating said organo aluminum compound in a closed system until an autogeneous pressure is reached therein and removing from the system organic material formed as a result of such heating while introducing said olefin in said closed system.

References Cited in the file of this patent

UNITED STATES PATENTS

| | | |
|---|---|---|
| 2,835,689 | Ziegler | May 20, 1958 |
| 2,863,896 | Johnson | Dec. 9, 1958 |

OTHER REFERENCES

Coats: Organo-Metallic Compounds, page 78 (1956).

UNITED STATES PATENT OFFICE
CERTIFICATION OF CORRECTION

Patent No. 2,976,306            March 21, 1961

Robert A. Walde

It is hereby certified that error appears in the above numbered patent requiring correction and that the said Letters Patent should read as corrected below.

Column 3, line 55, for "75.7" read -- 75.5 --.

Signed and sealed this 22nd day of August 1961.

(SEAL)
Attest:

ERNEST W. SWIDER
Attesting Officer

DAVID L. LADD
Commissioner of Patents